US008867369B2

(12) United States Patent
Sato

(10) Patent No.: US 8,867,369 B2
(45) Date of Patent: Oct. 21, 2014

(54) INPUT/OUTPUT CONNECTION DEVICE, INFORMATION PROCESSING DEVICE, AND METHOD FOR INSPECTING INPUT/OUTPUT DEVICE

(75) Inventor: Mitsuru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 13/047,137

(22) Filed: Mar. 14, 2011

(65) Prior Publication Data

US 2011/0228681 A1    Sep. 22, 2011

(30) Foreign Application Priority Data

Mar. 16, 2010 (JP) .................. 2010-059979

(51) Int. Cl.
*H04L 12/26* (2006.01)
*G06F 13/42* (2006.01)
*G06F 13/20* (2006.01)
*G06F 3/00* (2006.01)

(52) U.S. Cl.
CPC ................. *G06F 13/4295* (2013.01)
USPC ............... 370/242; 710/105; 710/313; 710/9

(58) Field of Classification Search
CPC ............................... G06F 13/4295
USPC .............. 370/242; 371/8; 710/9, 105, 313
See application file for complete search history.

(56) References Cited

U.S. PATENT DOCUMENTS

| 4,654,846 A * | 3/1987 | Goodwin et al. ............. 714/13 |
| 7,676,617 B2 * | 3/2010 | Kloeppner ................ 710/105 |
| 2003/0208283 A1 | 11/2003 | Vasko et al. |
| 2009/0198862 A1 | 8/2009 | Okitsu et al. |
| 2010/0306442 A1 * | 12/2010 | Gregg ........................... 710/313 |
| 2011/0029695 A1 * | 2/2011 | Kishore et al. ..................... 710/9 |

FOREIGN PATENT DOCUMENTS

| JP | 58-203533 | 11/1983 |
| JP | 08-227406 | 9/1996 |
| JP | 2003-518356 | 6/2003 |
| JP | 2009-009481 | 1/2009 |
| JP | 2009-181418 | 8/2009 |
| JP | 2012-529094 | 11/2012 |
| WO | 2010/139612 | 12/2010 |

OTHER PUBLICATIONS

Japanese Office Action dated Dec. 10, 2013 in Japanese Patent Application No. 2010-059979.
Gene Saghi, Implementing PCIe Advanced Error Reporting, PCI-SIG Developers Conference Jun. 2006, PCI-SIG, Jun. 2006, pp. 1-34, [online] the Internet <Date of search: Dec. 2, 2013>, URL:http://www.pcisig.com/developers/main/training_materials/get_document?doc_id=f96ce648eb6af1a8423e6f073f03420b1611cc4c.

* cited by examiner

*Primary Examiner* — Jung Park
*Assistant Examiner* — Albert Shih
(74) *Attorney, Agent, or Firm* — Staas & Halsey LLP

(57) ABSTRACT

An input/output connection device includes a generating section which generates an inspection packet that has a tag that uniquely identifies the packet, a transmitting section which transmits the inspection packet to the input/output device, a receiving section which receives a packet, a first determining section which determines, on the basis of a tag of the packet received by the receiving section, whether or not the received packet is a packet transmitted in response to the inspection packet transmitted by the transmitting section, and a second determining section which analyzes the received packet and determines whether or not the input/output device is normal when the first determining section determines that the received packet is the packet transmitted in response to the inspection packet.

10 Claims, 16 Drawing Sheets

FIG. 3

| | | | Byte Offset |
|---|---|---|---|
| 31  16 | 15  8 | 7  0 | |
| Device ID | Vender ID | | 00h |
| Status | Command | | 04h |
| Class Code | | Revision ID | 08h |
| . . . . . . . . . . . | | | ⋮ |
| . . . . . . . . . . . | | | 3ch |

FIG. 4

| ADDRESS | VALID/ INVALID | NORMAL/ ABNORMAL | TAG VALUE | TYPE | ORIGINAL TAG VALUE |
|---|---|---|---|---|---|
| 2 | VALID | ABNORMAL | 0x11 | RO | — |
| 3 | — | — | 0x12 | RO | — |

FIG. 5

| Fmt | Type | R | TC | R | Attr | R | TH | TD | EP | Attr | AT | Length | }21 |
|-----|------|---|----|----|------|---|----|----|----|------|----|--------|-----|
| Requester ID ||||||| TAG ||||| Last DW BE | 1st DW BE | |
| Bus Number ||||| Device Number | Function Number | Reserved ||| Ext. Reg. Number | Register Number || R | }22 |

FIG. 6

| Fmt | Type | R | TC | R | Attr | R | TH | TD | EP | Attr | AT | Length | }31 |
|-----|------|---|----|---|------|---|----|----|----|------|----|--------|-----|
| Completer ID |||||| Compl. Status || BCM | Byte Count |||| |
| Requester ID ||||||| TAG |||| R | Lower Address || }32 |

| ADDRESS | VALID/ INVALID | NORMAL/ ABNORMAL | TAG VALUE | TYPE | ORIGINAL TAG VALUE |
|---|---|---|---|---|---|
| 1 | VALID | ABNORMAL | 0x10 | RO | — |
| 2 | — | — | 0x11 | RO | — |
| 3 | — | — | 0x12 | CPU | 0x11 |

FIG. 16

| ADDRESS | VALID/INVALID | NORMAL/ABNORMAL | TAG VALUE | TYPE | ORIGINAL TAG VALUE |
|---|---|---|---|---|---|
| 1 | VALID | ABNORMAL | 0x10 | RO | — |
| 2 | — | — | 0x11 | CPU | 0x10 |
| 3 | — | — | 0x12 | AER | — |

FIG. 17

| 31 | 0 | Byte Offset |
|---|---|---|
| PCI Express Extended Capability Header || 00h |
| Uncorrectable Error Status Register || 04h |
| Uncorrectable Error Mask Register || 08h |
| . . . . . . . . . . || ⋮ |
| . . . . . . . . . . || 38h |

| TYPE | NAME |
|---|---|
| HwInit | Hardware Initialized |
| RO | Read-only |
| RW | Read-Write |
| RW1C | Write-1-to-clear status |
| ROS | Sticky-Read-only |
| RWS | Sticky-Read-Write |
| RW1CS | Sticky-Write-1-to-clear status |
| RsvdP | Reserved and Preserved |
| RsvdZ | Reserved and Zero |

INPUT/OUTPUT CONNECTION DEVICE, INFORMATION PROCESSING DEVICE, AND METHOD FOR INSPECTING INPUT/OUTPUT DEVICE

CROSS-REFERENCE TO RELATED APPLICATION

This application is based upon and claims the benefit of priority of the prior Japanese Patent Application No. 2010-59979, filed on Mar. 16, 2010, the entire contents of which are incorporated herein by reference.

BACKGROUND

Traditionally, a computer system includes a central processing unit (CPU); a main storage device; input/output equipment; an input/output device (hereinafter referred to as I/O device) that controls the input/output equipment; and an input/output connection device (hereinafter referred to as I/O connection device) that connects the CPU to the I/O device.

The input/output equipment includes an input device such as a keyboard or a mouse and an output device such as a display, a storage device (such as a hard disk drive (HDD)) or a speaker. In this specification, an interface (such as a network interface or a hard disk controller) that controls the input/output equipment is called an I/O device.

For example, the computer system reads data from the storage device through the I/O connection device and the I/O device according to an instruction operation performed by the CPU. In addition, for example, the computer system writes data in the storage device through the I/O connection device and the I/O device according to an instruction operation performed by the CPU.

In addition, the computer system displays, through the I/O connection device and the I/O device, the results of processing performed by the CPU. The computer system receives entered characters, an instruction operation, a command and the like through the I/O connection device and the I/O device.

A PCI bus through which data is transferred using a parallel bus has been used to transfer data between the I/O connection device and the I/O device. In recent years, however, PCI Express has been used as a communication standard instead of PCI buses.

PCI Express is different from PCI buses. PCI Express packetizes data and transfers through a serial connection. Thus, multiple I/O devices cannot be connected to a single bus, unlike PCI buses. According to PCI Express, a single I/O connection device is connected to a single I/O device.

Therefore, in order to connect a I/O connection device of PCI Express standard to multiple I/O devices, it is necessary to install a switching function in the I/O connection device and form a star-type configuration.

In order to improve reliability of the computer system, it is necessary to reduce the number of abnormalities (such as an erroneous change in data and a failure of a semiconductor) in the I/O devices, the CPU and the storage device. When an abnormality occurs, it is necessary to quickly detect the abnormality and take measures against the abnormality.

Recently, various methods for detecting an abnormality that has occurred in any of the I/O devices have been disclosed. For example, the following methods have been disclosed: a method for passively detecting whether or not the CPU normally accesses the I/O device in order to transfer data; and a method for actively detecting whether or not the CPU normally accesses the I/O device in order to transfer data while using a beacon scheme in which the CPU periodically receives a signal from the I/O device.

In addition, the following method has been disclosed: a method for actively detecting an abnormality of the I/O device under the control of software. Specifically, the CPU accesses the I/O device at constant time intervals specified by the software, and the computer system determines, on the basis of a response to the access, whether or not the I/O device is normal.

In addition, the following method has been disclosed: a method for actively detecting an abnormality of the I/O device under the control of hardware. Specifically, the hardware is connected to the I/O device, a monitoring function is provided in the hardware connected to the I/O device, and the computer system detects an abnormality of the I/O device using the monitoring function.

However, the conventional techniques have a problem that it is not possible to quickly detect an abnormality that has occurred in the I/O device.

For example, in the method for passively detecting an abnormality, the computer system can detect an abnormality only when the CPU accesses the input/output equipment (or the I/O device). Thus, there is the difference between the time at which the abnormality occurs and the time at which the abnormality is detected.

Thus, it is not possible to quickly detect an abnormality that has occurred in the I/O device. In addition, in the method for actively detecting an abnormality using the beacon scheme, the computer system detects an abnormality by confirming whether or not the computer system receives a response. Thus, it is not possible to detect an abnormality that has occurred in the I/O device.

In addition, in the method for detecting an abnormality using the software, when the access from the CPU to the I/O device is not normally terminated, an operation of the CPU may be stopped. For example, when the CPU accesses an abnormal I/O device, an operation of the CPU may be stopped and the CPU may cause the system to shut down. In this case, the computer system cannot quickly detect an abnormality that has occurred in the I/O device.

In the method for detecting an abnormality using the hardware, the computer system needs to have monitoring functions that are dedicated to the I/O devices, respectively.

In addition, since the I/O connection device is connected to multiple I/O devices, it is necessary that the I/O connection device has hardware parts that are dedicated to the I/O devices, respectively.

In this case, it may be difficult to install a hardware part for each of the I/O devices connected to the I/O connection device in the computer system, and it is difficult to say to be able to quickly detect abnormalities that have occurred to the multiple I/O devices.

SUMMARY

It is an object of the technique disclosed herein to provide an input/output connection device, an information processing device and a method for inspecting an input/output device, which allow an abnormality that occurs in the input/output device to be quickly detected.

According to an aspect of the embodiment, the input/output connection device includes a generating section which generates an inspection packet which has an uniquely identified tag, a transmitting section which transmits the inspection packet to the input/output device, a receiving section receives the inspection packet, a first determining section which determines, on the basis of the tag of the received inspection packet, whether or not the received inspection packet is a packet transmitted in response to the inspection packet transmitted by the transmitting section, and a second determining section which analyzing the received inspection packet, determines whether or not the input/output device is normal, when the first determining section determines that the received inspection packet is the packet transmitted in response to the inspection packet.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a type 1 configuration space header of an I/O device.

FIG. 4 is a diagram illustrating an example of data stored in a tag table according to the second embodiment.

FIG. 5 is a diagram illustrating an example of a header region that is added to an inspection packet generated by a generating section.

FIG. 6 is a diagram illustrating an example of a header region that is added to a response packet.

FIG. 16 is a diagram illustrating an example of data stored in a tag table according to the fourth embodiment.

FIG. 17 is a diagram illustrating an example of an AER register.

DESCRIPTION OF EMBODIMENTS

Embodiments of an input/output connection device disclosed herein, an information processing device disclosed herein and an input/output device inspecting method disclosed herein are described below in detail with reference to the accompanying drawings. The technique disclosed herein is not limited to the embodiments.

[a] First Embodiment

Figure 1:
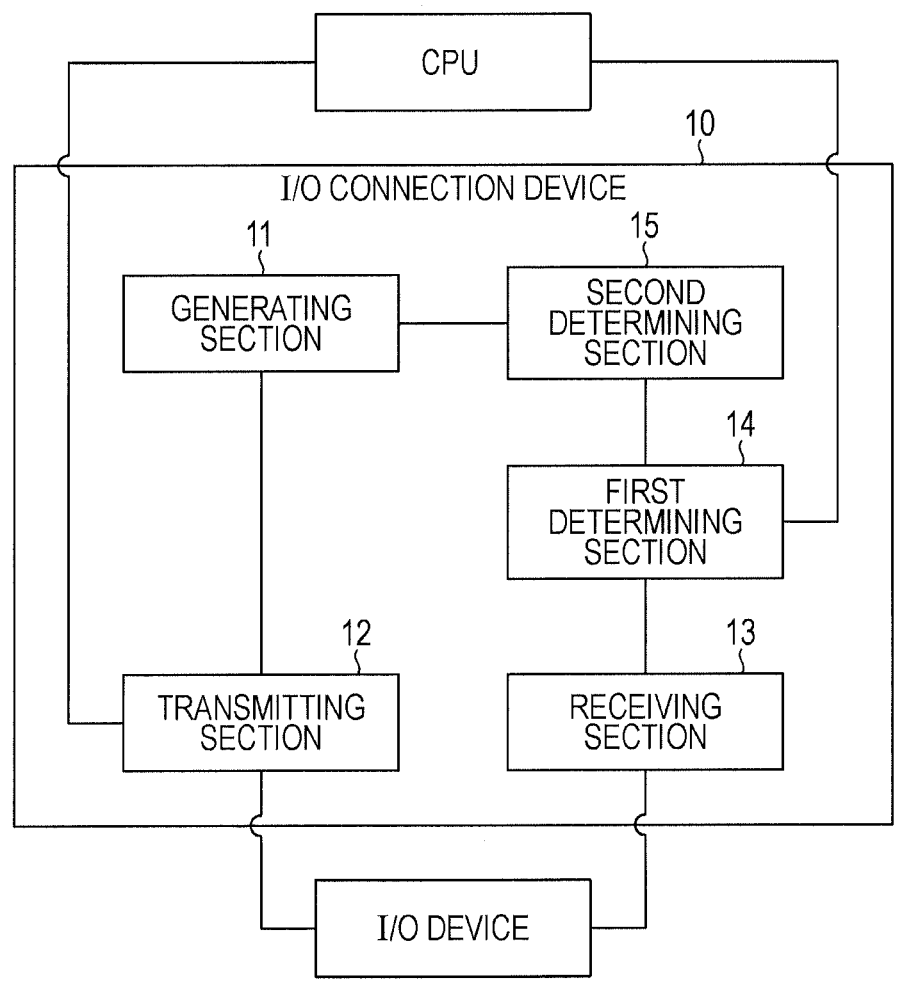
FIG. 1 is a functional block diagram illustrating the configuration of an I/O connection device according to a first embodiment.

FIG. 1 is a functional block diagram illustrating the configuration of an I/O connection device according to a first embodiment. As illustrated in FIG. 1, the I/O connection device 10 includes a generating section 11, a transmitting section 12, a receiving section 13, a first determining section 14, and a second determining section 15. The I/O connection device connects a CPU to an I/O device.

The generating section 11 generates a packet (hereinafter referred to as inspection packet) for inspection of an I/O device. The inspection packet has, added thereto, a tag that uniquely identifies the packet. The transmitting section 12 transmits, to the I/O device, the inspection packet generated by the generating section 11.

The receiving section 13 receives the packet. The first determining section 14 determines, on the basis of the tag included in the packet received by the receiving section 13, whether or not the packet received by the receiving section 13 is a packet (hereinafter referred to as response packet) transmitted in response to the inspection packet transmitted by the transmitting section 12.

When the first determining section 14 determines that the received packet is the response packet, the second determining section 15 analyzes the received packet, and determines whether or not the I/O device is normal.

In the first embodiment, the transmitting section 12 of the I/O connection device 10 periodically accesses the I/O device, and the second determining section 15 identifies the contents of the packet transmitted in response to the inspection packet. Thus, the I/O connection device 10 can quickly detect an abnormality that has occurred in the I/O device.

[b] Second Embodiment

Figure 2:
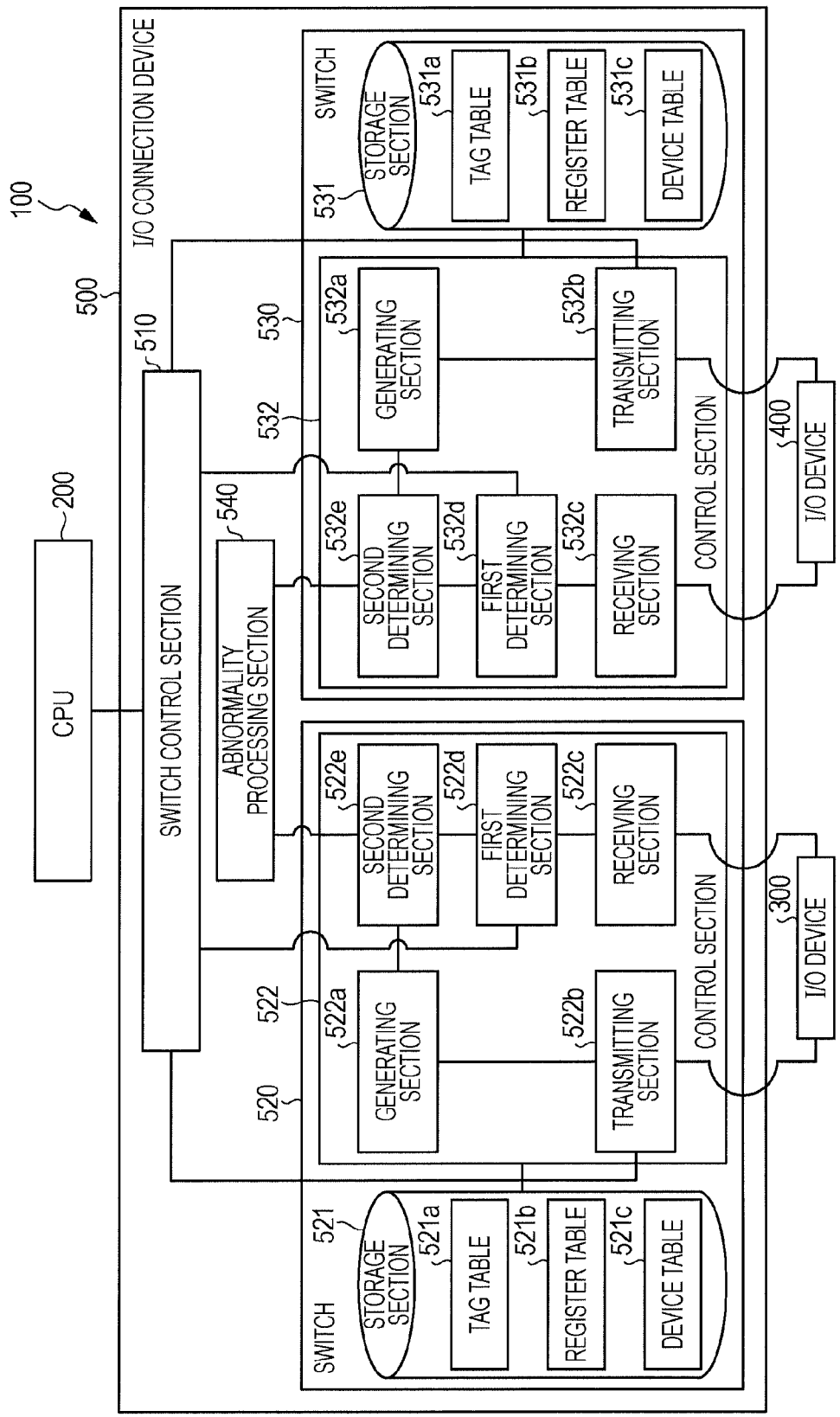
FIG. 2 is a functional block diagram illustrating the configuration of an information processing device according to a second embodiment.

Next, the configuration of an information processing device 100 according to a second embodiment is described with reference to FIG. 2. FIG. 2 is a functional block diagram illustrating the configuration of the information processing device according to the second embodiment.

The information processing device 100 according to the second embodiment includes a CPU 200, an I/O device 300, an I/O device 400 and an I/O connection device 500.

The CPU 200 is an electronic circuit that controls the devices included in the information processing device 100, and calculates and processes data. The I/O device 300 and the I/O device 400 are interfaces that are provided for input/output equipment that is connected via PCI Express. The I/O device 300 and the I/O device 400 are hardware such as network cards or storage controller cards.

In addition, the I/O device 300 and the I/O device 400 each connects to the information processing device 100 using PCI Express and includes a common register that stores an information on the own I/O device and a state of the own I/O device.

For example, the I/O device 300 includes read-only (RO) register and a read-write (RW) register in a type 1 configuration space header of 32 bits, as illustrated in FIG. 3. FIG. 3 is a diagram illustrating an example of the type 1 configuration space header included in the I/O device.

The I/O device 300 has a "Vender ID" register in the type 1 configuration space header. The "Vender ID" register is one of the RO registers of the I/O device 300. A unique identifier (vender ID) that specifies a manufacturer of the I/O device 300 is stored in the "Vender ID" register, while the identifier is not rewritten.

In addition, the I/O device 300 has a "Device ID" register in the type 1 configuration space header. A 16-bit identifier (device ID) that is used to identify the device manufactured by the manufacturer specified by the vendor ID is stored in the "Device ID" register that is one of the RO registers of the I/O device 300. In addition, the I/O device 300 has a "Revision ID" register in the type 1 configuration space header. An 8-bit identifier (class ID) that is used to specify a revision of the device specified by the vender ID and the device ID is stored in the "Revision ID" register that is one of the RO registers of the I/O device 300.

In addition, the I/O device 300 has a "Class Code" register in the type 1 configuration space header. Information (class code) that indicates the type and a function of the I/O device is stored in the "Class Code" register that is one of the RO registers of the I/O device 300. Furthermore, the I/O device 300 has a "Header Type" register in the type 1 configuration space header. Information that indicates whether the configuration space header of the I/O device has a single function or multiple functions is stored in the "Header Type" register that is one of the RO registers of the I/O device 300.

The I/O connection device 500 includes a switch control section 510, a switch 520, a switch 530 and an abnormality processing section 540. The I/O connection device 500 connects the CPU 200 to the I/O devices 300 and 400. The switches 520 and 530 have the same configuration. Thus, only the switch 520 is described below.

The switch control section 510 controls data transfer between the CPU 200 and the switches 520 and 530. For example, the switch control section 510 extracts, from a packet output from the CPU 200, information that specifies an I/O device to which the packet is transferred. Then, the switch control section 510 transfers the packet to the switch that is connected to the I/O device specified by the information included in the packet.

The switch 520 connects the switch control section 510, the abnormality processing section 540, and the I/O device 300 each other. The switch 520 includes a storage section 521 and a control section 522. The storage section 521 stores programs and data that are necessary for processes that are performed by the control section 522. The storage device 521 is a storage device such as a semiconductor memory element or a hard disk and has a tag table 521a, a register table 521b and a device table 521c.

The tag table 521a stores information on tags added to packets. The information stored in the tag table 521a is described with reference to FIG. 4. FIG. 4 is a diagram illustrating an example of data stored in the tag table according to the second embodiment.

The tag table 521a stores information in a "valid/invalid" field, a "normal/abnormal" field, a "tag value" field, a "type" field, and an "original tag value" field.

The "valid/invalid" field indicates whether the contents of the table are valid or invalid. The "normal/abnormal" field indicates information on the result of inspection performed by a second determining section 522e (described later).

The "tag value" field indicates tag information added by the generating section 522a (described later). The "type" field specifies whether an interested packet is a packet transmitted by the CPU 200 or an inspection packet.

For example, when the interested packet is the packet transmitted by the CPU 200, the "type field indicates "CPU". When the interested packet is the inspection packet, the "type" field specifies the type of a register to be accessed and indicates "RO", for example. When the tag is rewritten, the "original tag value" field indicates the value of the tag before the tag is rewritten.

In a row of address "2", the "valid/invalid" field indicates "valid"; the "normal/abnormal" field indicates "abnormal"; the "tag value" field indicates "0x11"; and the "type" field indicates "RO". Specifically, the tag table 521a indicates that the tag value of the inspection packet is "0x11" and the I/O device is abnormal as a result of access to an RO register of the I/O device. In a row of address "3", the "tag value" field indicates "0x12" and the "type" field indicates "RO".

Specifically, the tag table 521a indicates that the tag value of the inspection packet is "0x12" and the RO register is being accessed.

The register table 521b stores normal values of registers included in the PCI Express device. For example, the register table 521b stores a normal value of the "Vendor ID", a normal value of the "Device ID" and the like. The device table 521c stores the specific identifiers of the I/O devices connected to the I/O connection device 500 in the information processing device 100. Thus, the switch control section 510 can uniquely specify each of the I/O devices.

The control section 522 includes an internal memory that stores a control program, necessary data, and programs that define procedures of various processes.

The control section 522 includes the generating section 522a, a transmitting section 522b, a receiving section 522c, a first determining section 522d and the second determining section 522e.

For example, the control section 522 is an integrated circuit (such as an application specific integrated circuit (APIC) or a field programmable gate array (FPGA)) or an electronic circuit (such as a central processing unit (CPU) or a micro processing unit (MPU).

The generating section 522a is a control section that generates an inspection packet that has a tag added thereto. When the I/O device 300 is triggered to be inspected, the generating section 522a generates an inspection packet that has a tag in a header region. Then, the generating section 522a transmits the generated inspection packet to the transmitting section 522b.

When the generating section 522a receives, from the second determining section 522e (described later), a notification that indicates completion of inspection, the generating section 522a transfers the notification to the transmitting section 522b. The trigger to inspect the I/O device 300 can be arbitrarily set so that the I/O device 300 is inspected after a certain time elapses from the previous inspection, or so that the I/O device 300 is inspected at specified time intervals.

The header region that is added to the inspection packet is described below with reference to FIG. 5. FIG. 5 is a diagram illustrating an example of the header region that is added to the inspection packet generated by the generating section 522a.

As illustrated in FIG. 5, the header region includes a common header region 21 that is added to the inspection packet generated by the generating section 522a and a specific header region 22 that is added to the inspection packet on the basis of the I/O device to be inspected and the I/O connection device which performs the inspection.

For example, the specific header region 22 stores information on a "Requester ID", a "Tag", a "Device Number", a "Register Number" and the like.

The "Requester ID" is a number that indicates a device that outputs a request. In the example illustrated in FIG. 5, the ID of the CPU or the ID of a root complex is used.

The "Tag" is added in order to associate the request with a response to the request. The "Device Number" is the identifier added to a destination I/O device. The information processing device 100 can specify the I/O device from the header region by referencing the device table 521c of the storage section 521. The "Register Number" indicates a register to be used for inspection.

For example, the generating section 522a generates an inspection packet that has a unique "Tag" added thereto and specifies a "Device Number" and a "Register Number" in the specific header region 22. The generating section 522a transmits the generated inspection packet to the transmitting section 522b.

For example, the generating section 522a causes information specifying the RO registers such as the "Device ID" register and the "Vender ID" register to be stored in a "Register Number" field of the header region.

In addition, after the generating section 522a generates the inspection packet, the generating section 522a may write information on the generated tag value and information on the type in the tag table 521a.

For example, the generating section 522a writes the value of the tag added to the inspection packet in the "tag value" field of the tag table 521a and writes "RO" in the "type" field of the tag table 521a.

Returning to FIG. 2, the transmitting section 522b is a control section that transmits the inspection packet generated by the generating section 522a to the I/O device 300. For example, the transmitting section 522b references the device table 521c and specifies the I/O device to which the "Device Number" included in the inspection packet transmitted from the generating section 522a is assigned.

The transmitting section 522b transmits the inspection packet to the specified I/O device. Then, the destination I/O device that receives the inspection packet accesses a register specified by the "Register Number" included in the inspection packet, and acquires a value of the accessed register.

In addition, the transmitting section 522b determines whether or not an inspection packet that has the same tag as a tag added to a packet received from the CPU 200 is present.

For example, when the transmitting section 522b receives a packet from the CPU 200, the transmitting section 522b treats the tag included in the received packet as a key and searches the tag table 521a. Then, the transmitting section 522b determines whether or not an inspection packet that has the same tag as the tag added to the packet transmitted by the CPU 200 is present. When the inspection packet that has the same tag as the tag added to the packet transmitted by the CPU 200 is not present, the transmitting section 522b transmits the packet (received from the CPU 200) to the I/O device 300.

On the other hand, when the transmitting section 522b receives, from the CPU 200, a packet that has the same tag as the tag added to the inspection packet, the transmitting section 522b does not transmit, to the I/O device 300, the packet transmitted by the CPU 200.

For example, when the inspection packet that has the same tag as the tag added to the packet transmitted by the CPU 200 is present, the transmitting section 522b holds the packet received from the CPU 200 without transmitting the packet received from the CPU 200 until the transmitting section 522b receives, from the generating section 522a, the notification that indicates completion of inspection.

In other words, the transmitting section 522b holds the packet with the same tag as the tag added to the inspection packet without transmitting the packet until completion of inspection of the I/O device.

In addition, the transmitting section 522b may write, in the tag table 521a, information on the tag added to the packet received from the CPU 200. For example, the transmitting section 522b writes the tag added to the packet in the "tag value" field of the tag table 521a and writes "CPU" in the "type" field of the tag table 521a.

The receiving section 522c receives a packet from the I/O device 300. The first determining section 522d determines whether or not the packet received from the I/O device 300 is a response to access performed by the CPU 200 or a response to the inspection packet. Specifically, the first determining section 522d makes the determination on the basis of a tag added to a header region of the received packet by referencing the tag table 521a.

The header region that is added to the response packet received by the first determining section 522d is described with reference to FIG. 6.

FIG. 6 is a diagram illustrating an example of the header region added to the response packet. As illustrated in FIG. 6, the header region added to the response packet received by the first determining section 522d includes a common header region 31 and a specific header region 32.

Response packets received by the first determining section 522d each include a common header region 31. The specific header region 32 is added to the response packet on the basis of a destination of the packet.

For example, the specific header region 32 has information on a "Requester ID", a "Tag", a "Completer ID" and the like. The "Requester ID" is a number that indicates a device that outputs a request. For example, the "Requester ID" is the identifier of the CPU 200.

The "Tag" is added in order to associate the request with a response to the request. The "Completer ID" is the identifier of an I/O device that transmits the packet.

For example, the information processing device 100 can specify the I/O device from the header region by referencing the device table 521c of the storage section 521.

For example, the first determining section 522d treats, as a key, the tag included in the packet received from the I/O device 300, and searches the tag table 521a. Then, the first determining section 522d specifies a packet that has the same tag as the tag added to the received packet.

Specifically, the first determining section 522d determines whether or not a tag that is the same as the tag added to the received packet is present in the tag table 521a. Then, when the tag that is the same as the tag added to the received packet is present in the tag table 521a, the first determining section 522d transmits the received packet to the second determining section 522e.

On the other hand, when the first determining section 522d detects that the tag that is the same as the tag added to the received packet is not present in the tag table 521a, the first determining section 522d specifies that the packet received from the I/O device 300 is a packet transmitted in response to the packet transmitted by the CPU 200.

When the first determining section 522d determines that the packet received from the I/O device 300 is the packet transmitted in response to the packet transmitted by the CPU 200, the first determining section 522d transfers, to the CPU 200, the packet received from the I/O device 300.

When the first determining section 522d does not continuously receive the response packet for a predetermined time period, the first determining section 522d transmits, to the second determining section 522e, a notification that makes the second determining section 522e determine whether or not a timeout has occurred.

The second determining section 522e is a control section that receives, from the first determining section 522d, the packet transmitted in response to the inspection packet and determines whether or not the contents of the response packet are normal.

For example, the second determining section 522e reads the "Completer ID" from the received packet, and determines whether or not the read "Completer ID" matches the "Device ID" stored in the register table 521b. When the second determining section 522e determines that the read "Completer ID" matches the "Device ID" stored in the register table 521b, the second determining section 522e determines that the I/O device 300 is normal. Then, the second determining section 522e sets "invalid" in the "valid/invalid" field of the tag table 521a and deletes the interested tag information from the tag table 521a. Subsequently, the second determining section 522e notifies the generating section 522a of completion of the inspection.

On the other hand, when the second determining section 522e determines that the read "Completer ID" does not match the "Device ID" stored in the register table 521b, the second determining section 522e determines that the I/O device 300 is abnormal. The second determining section 522e sets "valid" in the "valid/invalid" field of the tag table 521a and writes, in the "normal/abnormal" field of the tag table 521a, the inspection result that indicates that the I/O device 300 is abnormal.

Subsequently, the second determining section 522e notifies the abnormality processing section 540 that the I/O device 300 is abnormal.

In addition, when the second determining section 522e receives the notification from the first determining section 522d in order to determine whether or not the timeout has occurred, the second determining section 522e determines whether or not a predetermined time elapses on the basis of time measured by the generating section 522a. When the second determining section 522e determines that the timeout that indicates the predetermined time elapses has occurred, the receiving section 522c does not receive a response from the I/O device 300 and whereby the second determining section 522e determines that a link-level abnormality occurs.

Then, the second determining section 522e writes, in the "normal/abnormal" field of the tag table 521a, the inspection result that indicates that the I/O device 300 is "abnormal".

Subsequently, the second determining section 522e notifies the abnormality processing section 540 (described later) that the I/O device 300 is abnormal. The predetermined time can be arbitrarily set by a user.

The abnormality processing section 540 is a control section that performs an abnormality process when an abnormality of the I/O device 300 is detected.

Figure 7:
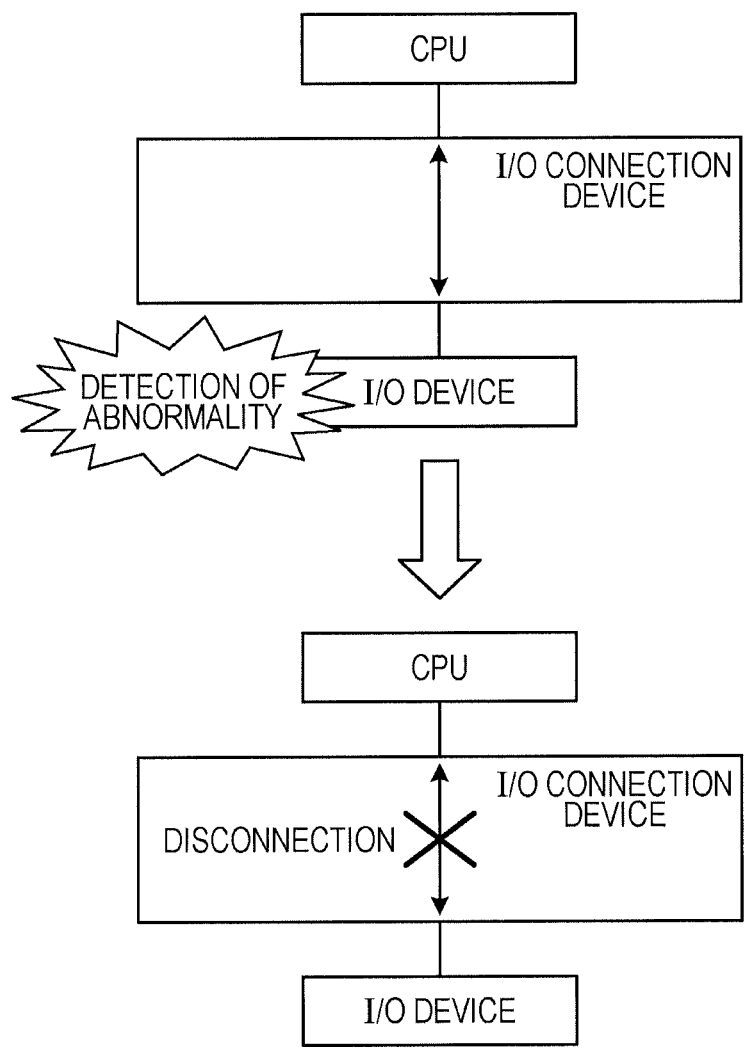
FIG. 7 is a diagram illustrating an example of a process that is performed by an abnormality processing section.

An example of the process that is performed by the abnormality processing section 540 is described with reference to FIG. 7. FIG. 7 is a diagram illustrating the example of the process that is performed by the abnormality processing section 540.

For example, when an abnormality of the I/O device 300 is detected, the abnormality processing section 540 disconnects the device in which the abnormality has occurred.

Specifically, when an abnormality of the I/O device 300 is detected, the abnormality processing section 540 notifies the transmitting section 522b and the receiving section 522c that the abnormality of the I/O device 300 is detected. As a result, the transmitting section 522b and the receiving section 522 release the connection to the I/O device 300.

When an abnormality occurs in the I/O device 400, the abnormality processing section 540 disconnects the I/O device 400 in the same manner as the I/O device 300.

Figure 8:
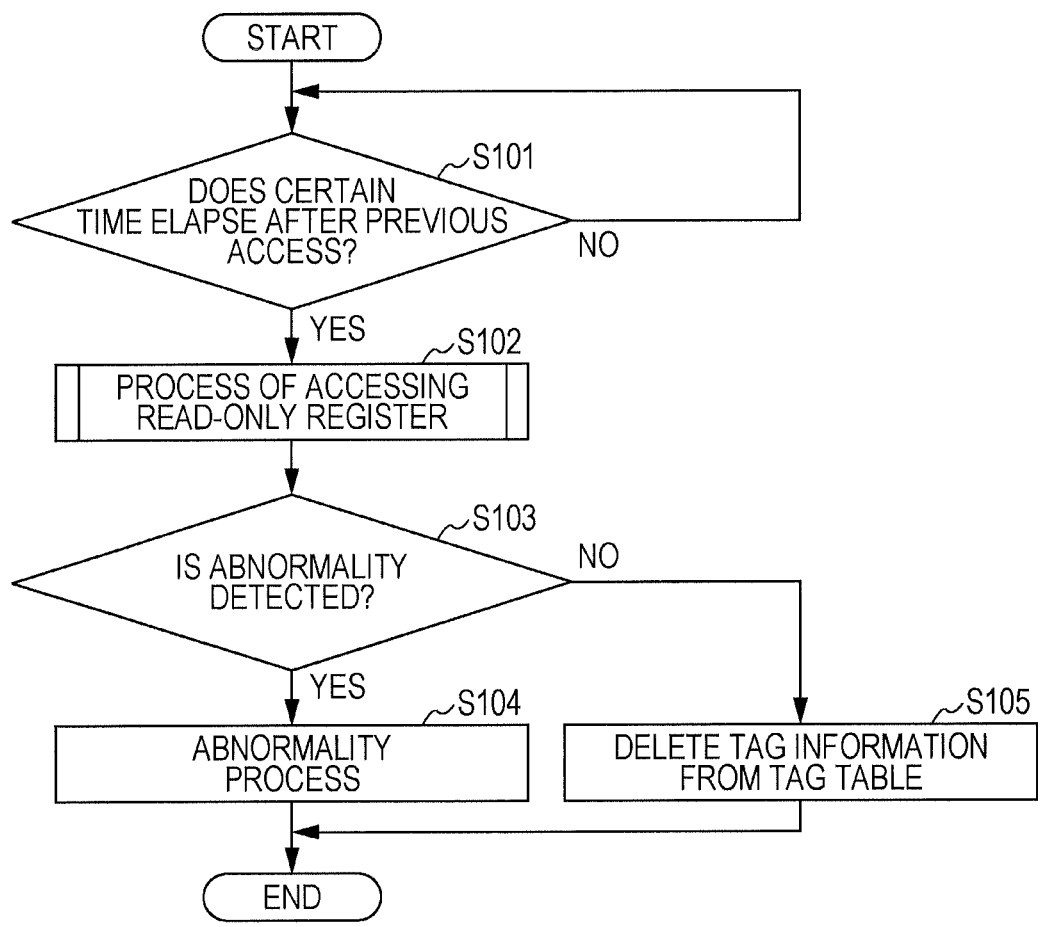
FIG. 8 is a flowchart of a process that is performed by the information processing device according to the second embodiment.

Next, steps of a process that is performed by the information processing device 100 according to the second embodiment are described with reference to FIG. 8. FIG. 8 is a flowchart of the process that is performed by the information processing device according to the second embodiment.

When the generating section 522a determines that a certain time elapses after previous access (Yes in step S101), the switch 520 performs a process of accessing a read-only register (in step S102).

The second determining section 522e of the switch 520 determines whether or not an abnormality is detected on the basis of the result of the read-only register accessing process (in step S103). When an abnormality is detected (Yes in step S103), the second determining section 522e notifies the abnormality processing section 540 that the abnormality is detected, and the abnormality processing section 540 performs the abnormality process (in step S104).

On the other hand, when an abnormality is not detected (No in step S103), the second determining section 522e deletes tag information from the tag table 521a (in step S105).

Figure 9:
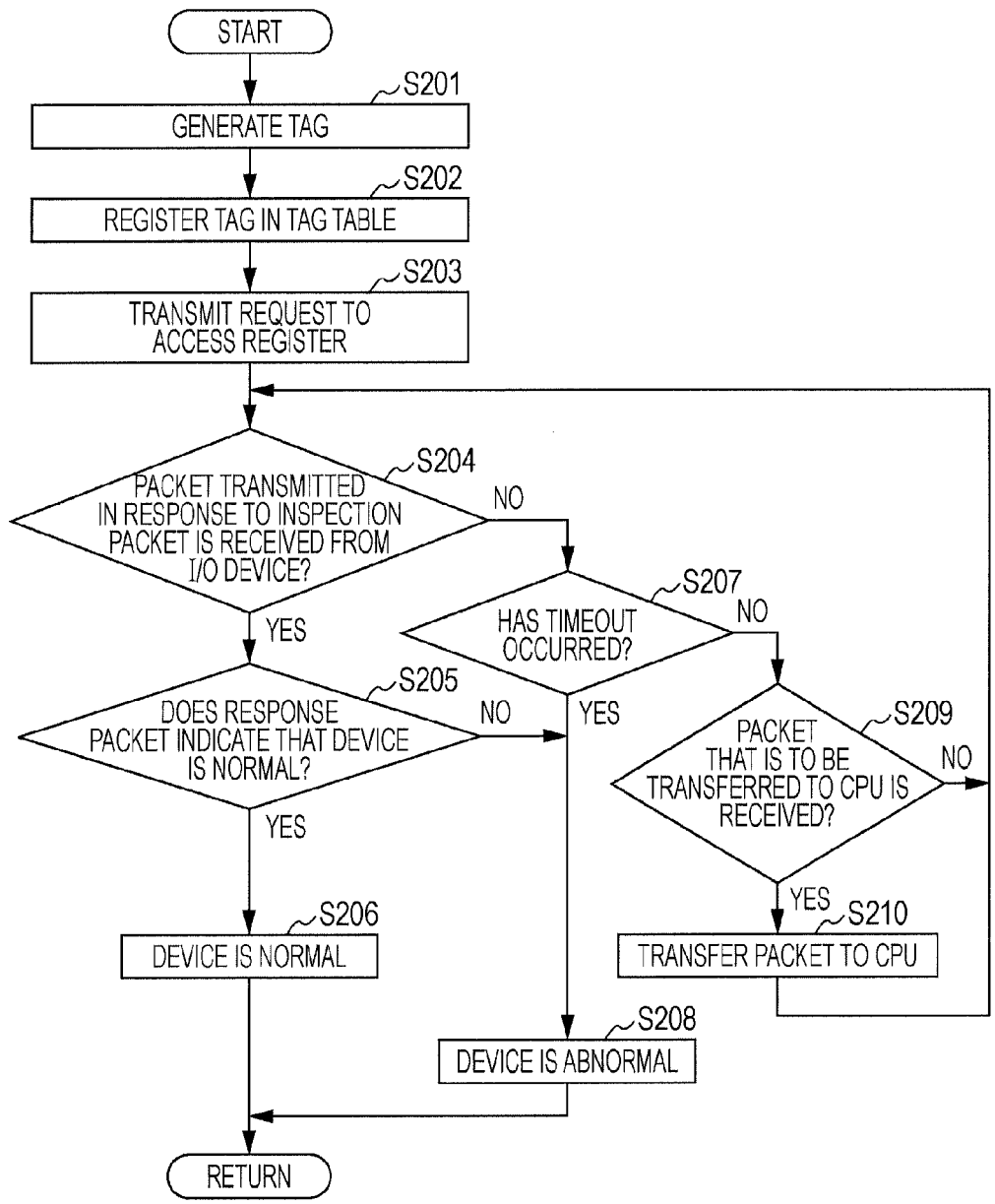
FIG. 9 is a flowchart of a register accessing process according to the second embodiment.

Steps of the register accessing process according to the second embodiment are described with reference to FIG. 9. FIG. 9 is a flowchart of the register accessing process according to the second embodiment. The register accessing process corresponds to step S102 of FIG. 8.

The generating section 522a of the switch 520 generates a tag (in step S201) and registers the generated tag in the tag table (in step S202). Then, the generating section 522a generates an inspection packet that has the generated tag added thereto. The generating section 522a transmits the generated inspection packet to the I/O device 300 and requests the I/O device 300 to access a register (in step S203).

The first determining section 522d determines whether or not the first determining section 522d receives a packet that has been transmitted by the I/O device 300 in response to the inspection packet (in step S204). When the first determining section 522d determines that the first determining section 522d receives the packet (response packet) that has been transmitted by the I/O device 300 in response to the inspection packet (Yes in step S204), the second determining section 522e analyzes the data contents of the response packet and determines whether or not the I/O device 300 is normal (in step S205).

When the second determining section 522e determines that the data contents of the response packet do not include an abnormality (Yes in step S205), the second determining section 522e determines that the I/O device 300 that transmitted the response packet is normal (in step S206).

On the other hand, when the second determining section 522e determines that the data contents of the response packet include an abnormality (No in step S205), the second determining section 522e determines that the I/O device 300 that transmitted the response packet is abnormal (in step S208).

When the first determining section 522d determines that the received packet is not the packet transmitted in response to the inspection packet (No in step S204), the first determining section 522d determines whether or not a timeout has occurred (in step S207).

When the first determining section 522d determines that a timeout has occurred (Yes in step S207), the second determining section 522e determines that the I/O device 300 is abnormal (in step S208).

When the second determining section 522e determines that the timeout has not occurred (No in step S207), the first determining section 522d determines whether or not the first determining section 522d receives, from the I/O device 300, a response packet to be transferred to the CPU 200 (in step S209).

When the first determining section 522d receives, from the I/O device 300, the response packet to be transferred to the CPU 200 (Yes in step S209), the first determining section 522d transfers the packet to the CPU 200 (in step S210). When the first determining section 522d does not receive, from the I/O device 300, the response packet to be transferred to the CPU 200 (No in step S209), the first determining section 522d continues to determine whether or not the first determining section 522d receives the packet that has been transmitted by the I/O device 300 in response to the inspection packet (in step S204).

Figure 10:
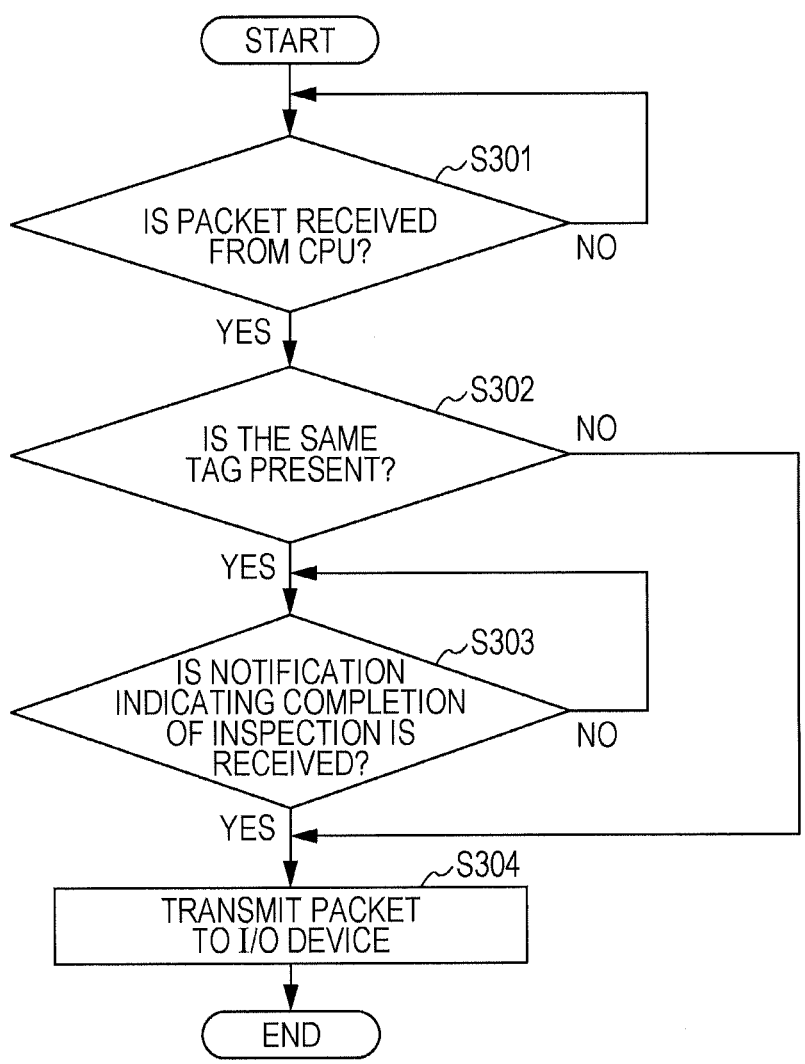
FIG. 10 is a flowchart of a process that is performed by a transmitting section according to the second embodiment.

Steps of a process that is performed by the transmitting section 522b according to the second embodiment are described with reference to FIG. 10. FIG. 10 is a flowchart of the process that is performed by the transmitting section when the transmitting section receives a packet from the CPU according to the second embodiment.

When the transmitting section 522b receives a packet from the CPU 200 (Yes in step S301), the transmitting section 522b determines whether or not an inspection packet that has the same tag as the tag of the received packet is present (in step S302). When the transmitting section 522b determines that the inspection packet that has the same tag as the tag of the received packet is not present (No in step S302), the transmitting section 522b transmits the received packet to the I/O device 300 (in step S304).

On the other hand, when the transmitting section 522b determines that the inspection packet that has the same tag as the tag of the received packet is present (Yes in step S302), the transmitting section 522b determines whether or not the transmitting section 522b receives the notification that indicates completion of inspection of the I/O device 300 (in step S303).

When the transmitting section 522b determines that the transmitting section 522b receives the notification that indicates completion of the inspection (Yes in step S303), the transmitting section 522b transmits the received packet to the I/O device 300 (in step S304). When the transmitting section 522b determines that the transmitting section 522b does not receive the notification that indicates completion of the inspection (No in step S303), the transmitting section 522b holds the received packet without transmitting the received packet to the I/O device 300 until the transmitting section 522b receives the notification that indicates completion of the inspection.

As described above, the generating section 522a of the information processing device 100 according to the second embodiment generates an inspection packet that has a tag added thereto. The transmitting section 522b periodically transmits the generated inspection packet to the common register of the I/O device 300. The receiving section 522c receives a packet from the I/O device 300. The first determining section 522 determines, on the basis of a tag of the packet which the receiving section 522c received from the I/O device 300, whether or not the received packet is a packet transmitted in response to the inspection packet transmitted by the transmitting section 522b.

Then, the second determining section 522e determines whether or not the I/O device 300 is normal on the basis of the contents of the response packet that has been determined by the first determining section 522d as a packet transmitted in response to the inspection packet. In addition, when the second determining section 522e determines that the I/O device 300 is abnormal on the basis of the contents of the response packet, the second determining section 522e notifies the abnormality processing section 540 that the I/O device 300 is abnormal.

The abnormality processing section 540 performs the abnormality process so as to disconnect, from the CPU 200, the I/O device 300 that has been determined to be abnormal.

In addition, when the transmitting section 522b receives, from the CPU 200, a packet that has the same tag as a tag added to the inspection packet, the transmitting section 522b does not transmits, to the I/O device 300, the packet transmitted by the CPU 200. After the determination, the second determining section 522e notifies the transmitting section 522b of the determination result. When the transmitting section 522b receives the notification from the second determining section 522e, the transmitting section 522b transmits, to the I/O device 300, the packet transmitted by the CPU 200.

Therefore, the information processing device 100 according to the second embodiment is capable of detecting promptly an abnormality that has occurred in the I/O device 300. In addition, since the I/O device 300 in which the abnormality has occurred is disconnected, the information processing device 100 can prevents the CPU 200 from stopping an operation of the CPU 200. Since the CPU 200 does not cause the system to shut down, the information processing device 100 can inspect a device in which an abnormality has occurred.

In addition, the information processing device 100 according to the second embodiment does not need to have monitoring functions dedicated to the I/O devices 300 and 400 and can inspect all PCI Express devices in the same manner.

Even when the information processing device 100 according to the second embodiment accesses a register of the I/O device 300, the I/O device 300 is not adversely affected.

[c] Third Embodiment

In the second embodiment, when a packet that is received by the transmitting section 522b from the CPU 200 has the same tag as a tag generated by the I/O connection device 500, the transmitting section 522b does not transmit the packet. In addition, in the second embodiment, the transmitting section 522b confirms that the I/O device 300 is normal after completion of inspection, and the transmitting section 522b then transmits the packet received from the CPU 200.

However, in some cases, it is preferable that the packet received from the CPU 200 is transmitted without delay.

The third embodiment describes a method for inspecting an I/O device in an information processing device without delaying transmission of a packet transmitted by the CPU, when an inspection packet that has the same tag as the packet transmitted by the CPU is present.

Figure 11:
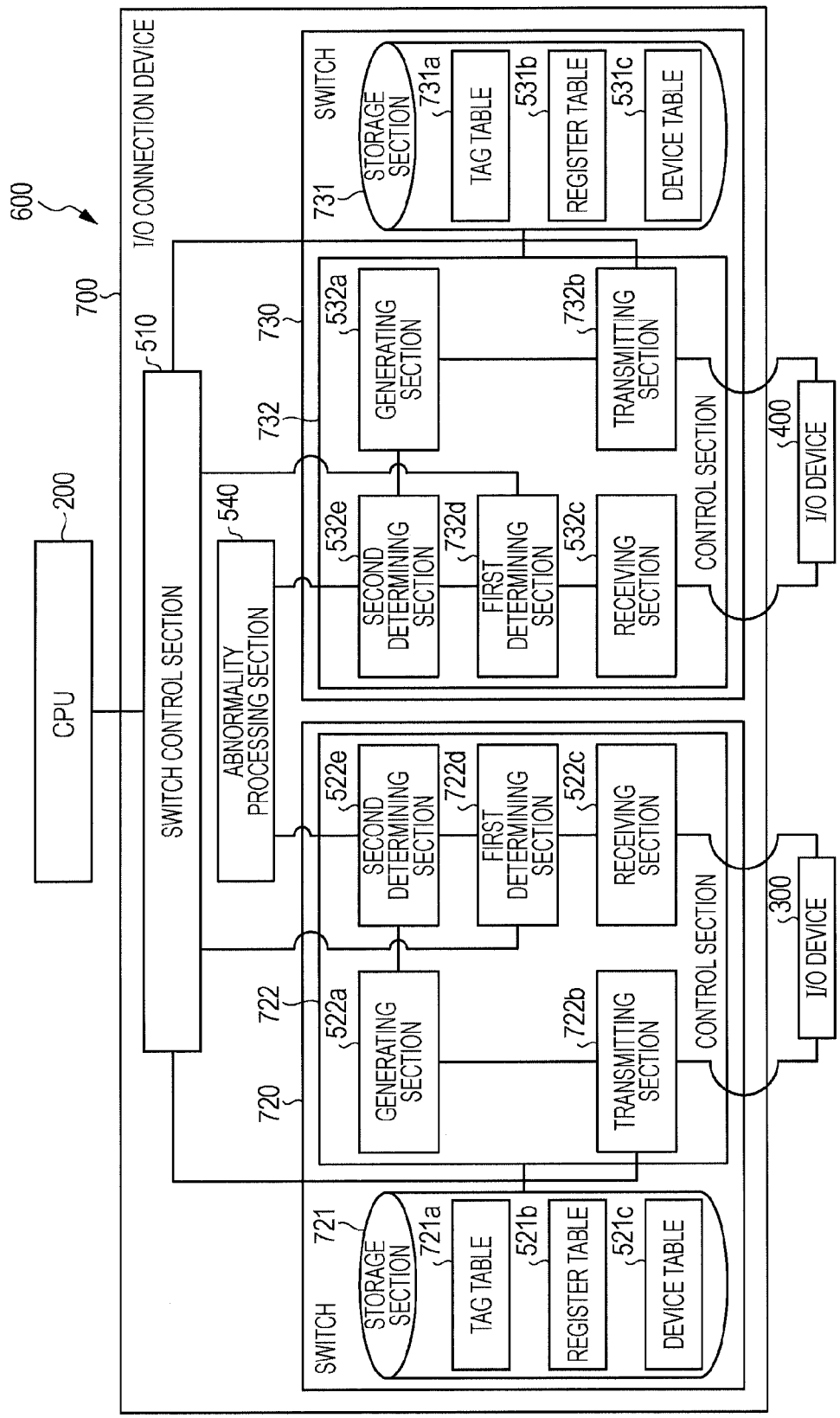
FIG. 11 is a functional block diagram illustrating the configuration of an information processing device according to a third embodiment.

Next, the configuration of an information processing device 600 according to the third embodiment is described with reference to FIG. 11. FIG. 11 is a functional block diagram illustrating the configuration of the information processing device according to the third embodiment.

The information processing device 600 according to the third embodiment includes the CPU 200, the I/O device 300, the I/O device 400 and an I/O connection device 700. In the third embodiment, functional parts that play the same roles as the parts illustrated in FIG. 2 are indicated by the same reference numerals as in FIG. 2, and are not described in detail.

The I/O connection device 700 includes the switch control section 510, a switch 720, a switch 730 and the abnormality processing section 540. The I/O connection device 700 connects the CPU 200 to the I/O devices 300 and 400. Since the switch 720 and the switch 730 have the same configuration, only the switch 720 is described below.

The switch 720 connects the switch control section 510, the abnormality processing section 540 and the I/O device 300 to each other and includes a storage section 721 and a control section 722.

The storage section 721 stores programs and data that are necessary for various processes that are performed by the control section 722. The storage section 721 is a storage device such as a semiconductor memory element or a hard disk and has a tag table 721a, the register table 521b and the device table 521c.

Figures 12, 13:
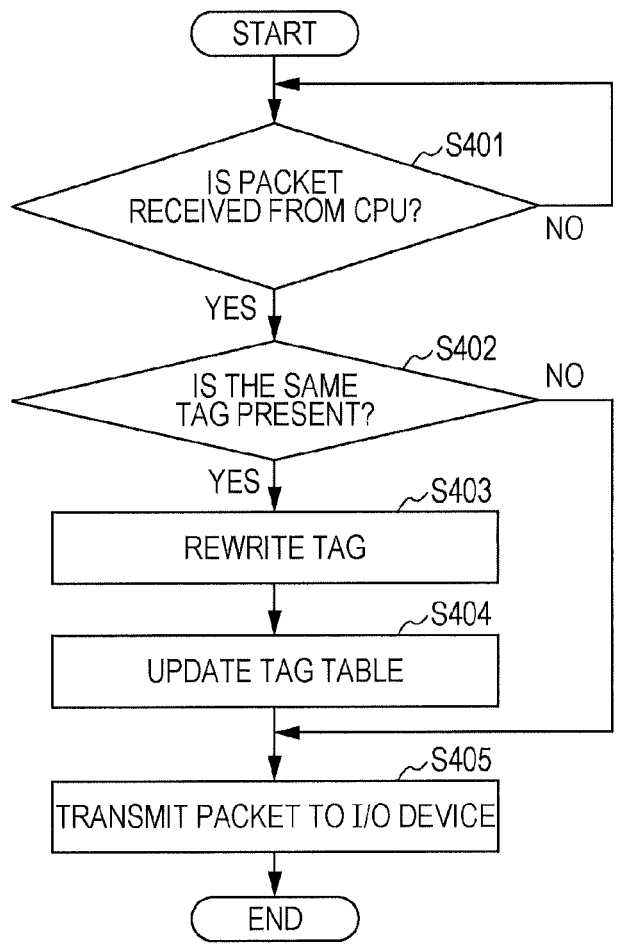
FIG. 12 is a diagram illustrating an example of data stored in a tag table according to the third embodiment.
FIG. 13 is a flowchart of a process that is performed by a transmitting section according to the third embodiment.

The tag table 721a stores information on tags added to packets. The information stored in the tag table 721a is described with reference to FIG. 12. FIG. 12 is a diagram illustrating an example of data stored in the tag table according to the third embodiment.

For example, the tag table 721a according to the third embodiment stores information in a "valid/invalid" field, a "normal/abnormal" field, a "tag value" field, a "type" field and an "original tag value" field. The "valid/invalid" field indicates whether the contents of the table are valid or invalid.

The "normal/abnormal" field indicates information on the result of inspection performed by the second determining section 522e. The "tag value" field indicates tag information added by the generating section 522a or tag information written over a tag (added to a packet transmitted by the CPU 200) by a transmitting section 722b.

The "type" field indicates the type of a register. The "original tag value" field indicates the value of a tag before the tag is rewritten.

In a row of address "1", the "valid/invalid" field indicates "valid"; the "normal/abnormal" field indicates "abnormal"; the "tag value" field indicates "0x10"; and the "type" field indicates "RO". Specifically, the tag value of the inspection packet is "0x10", and the I/O device is abnormal as a result of access to an RO register of the I/O device.

In a row of address "2", the "tag value" field indicates "0x11"; and the "type" field indicates "RO". Specifically, the tag value of the inspection packet is "0x11", and an RO register is being accessed.

In a row of address "3", the "tag value" field indicates "0x12"; the "type" field indicates "CPU"; and the "original tag value" indicates "0x11". Specifically, the row of address "3" indicates that a tag added to a packet transmitted by the CPU 200 has a value "0x11" that is the same as the value of the tag of the inspection packet, and thus the value of the tag added to the packet transmitted by the CPU 200 is changed to "0x12".

The control section 722 includes an internal memory that stores a control program, necessary data, and programs that define procedures of various processes. The control section 722 includes the generating section 522a, the transmitting section 722b, the receiving section 522c, a first determining section 722d and the second determining section 522e.

For example, the control section 722 is an integrated circuit (such as an application specific integrated circuit (ASIC) or a field programmable gate array (FPGA)) or an electronic circuit (such as a central processing unit (CPU) or a micro processing unit (MPU).

The transmitting section 722b has the following function added to the function as well as the function of the transmitting section 522b described in the second embodiment. When the transmitting section 722b receives, from the CPU 200, a packet that has the same tag as the tag added to the inspection packet, the transmitting section 722b rewrites the tag of the packet received from the CPU 200 and transmits, to the I/O device 300, the packet with the rewritten tag.

For example, the transmitting section 722b searches the tag table 721a and determines whether or not a tag that is the same as the tag added to the packet transmitted from the CPU 200 is present in the tag table 721a.

When an inspection packet that has the same tag as the tag added to the packet transmitted from the CPU 200 is present, the transmitting section 722b rewrites the tag added to the packet received from the CPU 200 and updates the tag table 721a.

Subsequently, the transmitting section 722b transfers, to the I/O device 300, the rewritten packet received from the CPU 200.

For example, when the transmitting section 722b receives, from the CPU 200, a packet that has a tag with a value "0x11" that is the same as the value "0x11" of a tag added to an inspection packet, the transmitting section 722b rewrites the tag of the received packet so that the tag has a value "0x12". Then, the transmitting section 722b causes information on the rewritten tag to be stored in the tag table 721a.

The first determining section 722d has the following function added to the function as well as the function of the first determining section 522d described in the second embodiment.

For example, when a packet received by the first determining section 722d is a packet transmitted in response to access performed by the CPU 200, the first determining section 722d extracts tag information added to the received packet, searches the tag table 721a, and determines whether or not the tag added to the packet has been rewritten.

When the tag has been rewritten, the first determining section 722d writes the value of the tag added to the packet so that the tag has the original value before rewriting. The first determining section 722d transfers, to the CPU 200, the packet with the written tag that has the original value.

The first determining section 722d searches the tag table 721a to search the original value of the tag that has the value "0x12" and has been added to a packet to be transferred to the CPU 200. Then, the first determining section 722d writes the value of the tag so that the tag has the value "0x11". The first determining section 722d then deletes information on the packet from the tag table 721a.

Steps of a process that is performed by the transmitting section 722b according to the third embodiment are described with reference to FIG. 13. FIG. 13 is a flowchart of the process that is performed by the transmitting section according to the third embodiment.

When the transmitting section 722b determines that the transmitting section 722b receives a packet from the CPU 200 (Yes in step S401), the transmitting section 722b determines whether or not an inspection packet that has the same tag as a tag of the received packet is present (in step S402).

When the transmitting section 722b determines that the inspection packet that has the same tag as the tag of the received packet is not present (No in step S402), the transmitting section 722b transmits the received packet to the I/O device that is a destination of the packet (in step S405).

On the other hand, when the transmitting section 722b determines that the inspection packet that has the same tag as the tag of the received packet is present (Yes in step S402), the transmitting section 722b rewrites the tag of the packet received from the CPU 200 (in step S403). Then, the transmitting section 722b writes, in the tag table 721a, information that indicates that the tag has been rewritten, and whereby the transmitting section 722b updates the tag table 721a (in step S404).

Subsequently, the transmitting section 722b transmits the packet with the rewritten tag to the I/O device 300 that is the destination of the packet (in step S405).

Figure 14:
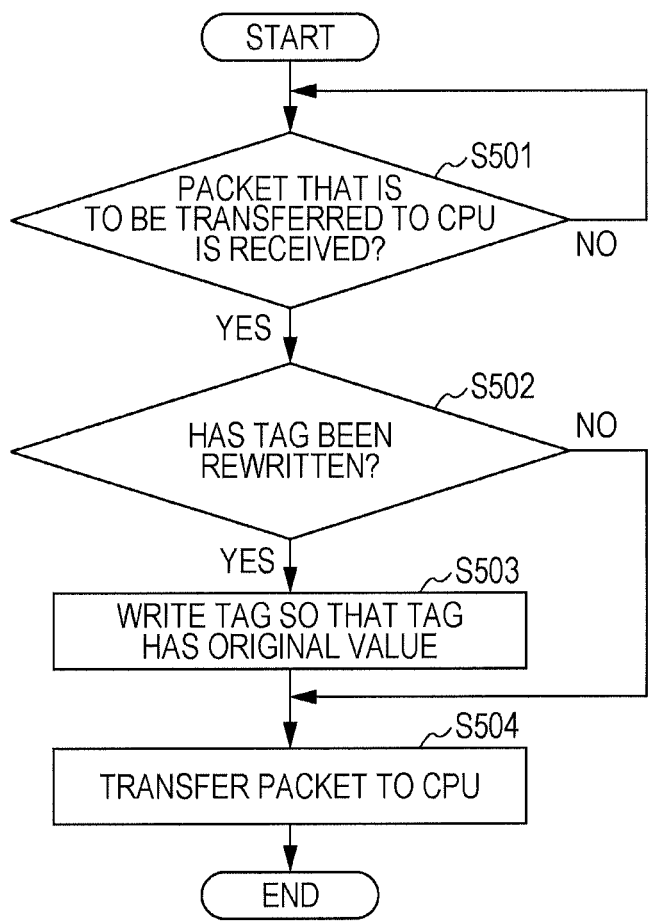
FIG. 14 is a flowchart of a process that is performed by the information processing device according to the third embodiment when a packet that is to be transferred to a CPU is received.

Steps of a process that is performed by the information processing device 600 according to the third embodiment when a packet to be transferred to the CPU 200 is received are described with reference to FIG. 14. FIG. 14 is a flowchart of the process that is performed by the information processing device according to the third embodiment when a packet that is to be transferred to the CPU is received.

When the first determining section 522d determines that the first determining section 522d receives a packet to be transferred to the CPU 200 (Yes in step S501), the first determining section 522d references the tag table 721a and determines whether or not the tag of the received packet has been rewritten (in step S502).

When the first determining section 522d determines that the tag of the received packet has been rewritten (Yes in step S502), the first determining section 522d writes the value of the tag so that the tag has the original value (in step S503), and the first determining section 522d transfers the packet to the CPU 200 (in step S504).

On the other hand, when the first determining section 522d determines that the tag of the received packet has not been rewritten (No in step S502), the first determining section 522d transfers the received packet to the CPU 200 without rewriting the tag (in step S504).

As described above, in the third embodiment, when the transmitting section 722b receives a packet that has the same tag as a tag added by the generating section 522a, the transmitting section 722b rewrites the tag of the packet received from the CPU 200 and transmits the packet to the I/O device 300.

Thus, the information processing device 600 can transfer, to the I/O device 300, the packet received from the CPU 200 without delay.

[d] Fourth Embodiment

In the second and third embodiments, it is possible to determine whether or not an abnormality occurs in an I/O device without interference with the device by accessing the common register of the PCI Express device. In this case, it is preferable that the information processing device acquires detailed information on the abnormality that has occurred in the I/O device. The fourth embodiment describes the case in which an inspection packet is transmitted to the PCI Express device that has an advanced error reporting (AER) function; an abnormality that has occurred in the PCI Express device is inspected by analyzing a response packet; and detailed information on the inspected abnormality is acquired.

Figure 15:
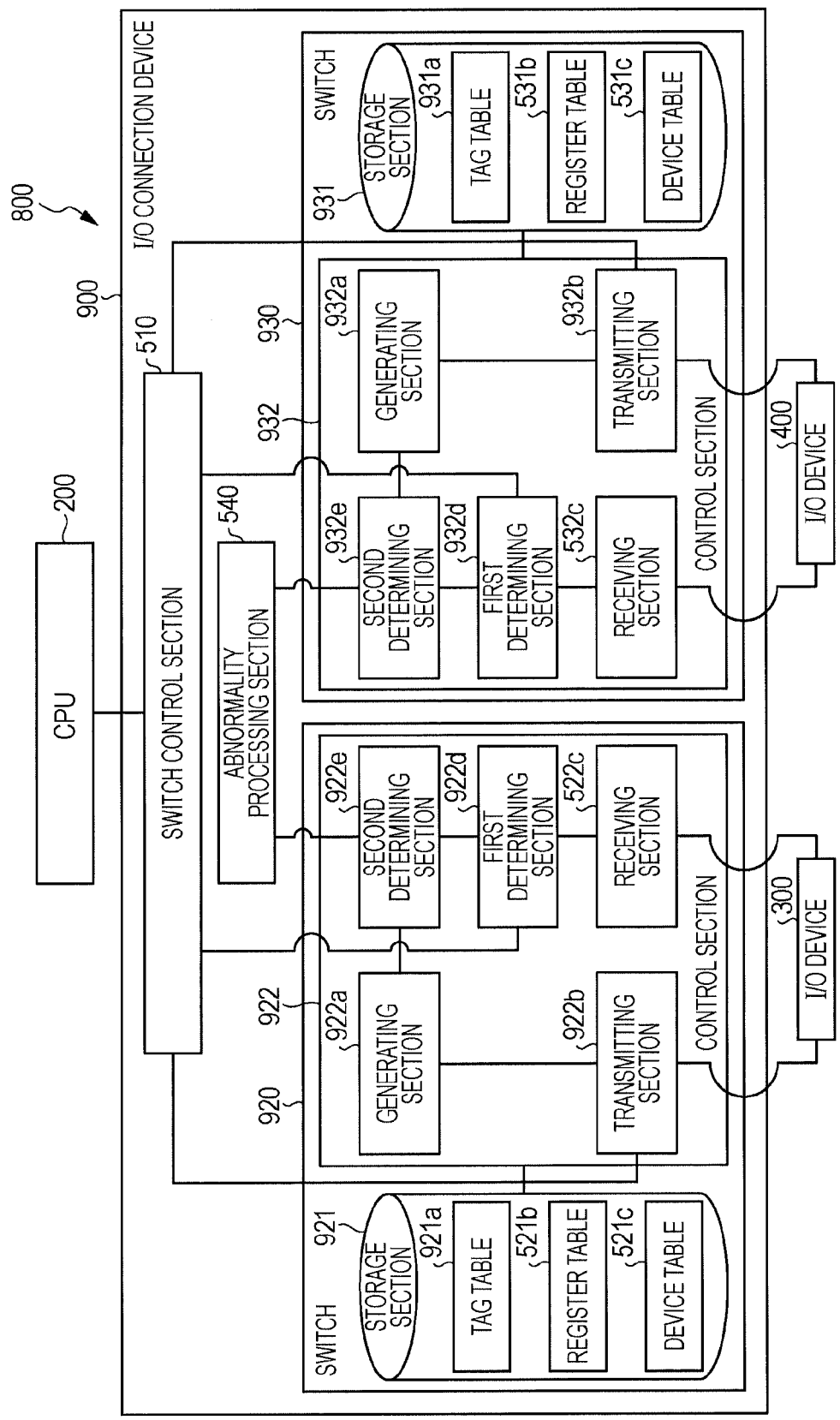
FIG. 15 is a functional block diagram illustrating the configuration of an information processing device according to a fourth embodiment.

Next, the configuration of an information processing device 800 according to the fourth embodiment is described with reference to FIG. 15. FIG. 15 is a functional block diagram illustrating the configuration of the information processing device according to the fourth embodiment.

The information processing device 800 according to the fourth embodiment includes the CPU 200, the I/O device 300, the I/O device 400 and an I/O connection device 900.

In the fourth embodiment, functional parts that play the same roles as the parts illustrated in FIG. 2 are indicated by the same reference numerals as in FIG. 2, and are not described in detail.

The I/O connection device 900 includes the switch control section 510, a switch 920, a switch 930 and the abnormality processing section 540. The I/O connection device 900 connects the CPU 200 to the I/O devices 300 and 400. Since the switch 920 and the switch 930 have the same configuration, only the switch 920 is described below.

The switch 920 connects the switch control section 510, the abnormality processing section 540 and the I/O device 300 to each other and includes a storage section 921 and a control section 922.

The storage section 921 stores programs and data that are necessary for various processes performed by the control section 922. The storage section 921 is a storage device such as a semiconductor memory element or a hard disk and includes a tag table 921a, the register table 521b and the device table 521c.

The tag table 921a stores information on tags added to packets. The information stored in the tag table 921a is described with reference to FIG. 16. FIG. 16 is a diagram illustrating an example of data stored in the tag table according to the fourth embodiment.

For example, the tag table 921 according to the fourth embodiment stores information in a "valid/invalid" field, a "normal/abnormal" field, a "tag value" field, a "type" field and an "original tag value" field. The "valid/invalid" field indicates whether the contents of the table are valid or invalid.

The "normal/abnormal" field indicates information on the result of inspection performed by a second determining section 922e. The "tag value" field indicates tag information added by a generating section 922a. The "type" field specifies whether an interested packet is a packet transmitted from the CPU 200 or an inspection packet.

For example, when the interested packet is the packet transmitted from the CPU 200, the "type" field indicates "CPU". When the interested packet is the inspection packet, the "type" field indicates the type of a register to be accessed, for example.

Specifically, when the "type" field indicates "AER", an AER register is accessed according to the inspection packet. The "original tag value" field indicates the value of a tag before the tag is rewritten.

In a row of address "1", the "valid/invalid" field indicates "valid"; the "normal/abnormal" field indicates "abnormal"; the "tag value" field indicates "0x10"; and the "type" field indicates "RO". Specifically, the row of address "1" indicates that the tag of the inspection packet has a value "0x10" and the I/O device is abnormal as a result of access to an RO register of the I/O device.

In a row of address "2", the "tag value" field indicates "0x11"; the "type" field indicates "CPU; and the "original tag value" field indicates "0x10". Specifically, the row of address "2" indicates that a tag added to a packet transmitted by the CPU 200 has a value "0x10" that is the same as the value of the tag added to the inspection packet, and thus the value of the tag added to the packet transmitted by the CPU 200 is changed to "0x11".

In a row of address "3", the "tag value" indicates "0x12, and the "type" field indicates "AER". Specifically, the tag of the inspection packet has a value "0x12, which the AER register has been accessed according to the inspection packet.

The control section 922 has an internal memory that stores a control program and necessary data that define procedures of various processes. The control section 922 includes the generating section 922a, a transmitting section 922b, the receiving section 522c, a first determining section 922d and the second determining section 922e.

For example, the control section 922 is an integrated circuit such as an application specific integrated circuit (ASIC) or a field programmable gate array (FPGA), or an electronic circuit such as a central processing unit (CPU) or a micro processing unit (MPU).

The generating section 922a has the following function added to the same function as the function of the generating section 522a described in the second embodiment. When the generating section 922a receives, from the second determining section 922e (described later), a notification that indicates completion of inspection of the common register, the generating section 922a determines whether or not the I/O device 300 has an AER function.

When the generating section 922a determines that the I/O device 300 has the AER function, the generating section 922a generates a packet (inspection packet) for inspection of an AER register of the I/O device 300. When the generating section 922a determines that the I/O device 300 does not have the AER function, inspection is terminated.

An example of the AER register is described with reference to FIG. 17. FIG. 17 is a diagram illustrating the example of the AER register.

Various registers illustrated in FIG. 17 each have 32 bits and are registers standardized as options of PCI Express. The registers illustrated in FIG. 17 are storing information on detailed internal states of the I/O device 300.

An abnormality that occurs in the I/O device 300 provided with the AER function can be inspected by the same method as the accessing method described in the first embodiment or the like.

For example, the switch 920 generates a packet that has a header of the format illustrated in FIG. 5. The switch 920 sets the ID of the CPU 200 in a Requester ID field. In addition, the switch 920 sets the ID of the I/O device 300 in a Bus Number field, a Device Number field and a Function Number field.

In addition, an address at which the AER register is located is specified in a Register Number field, and the switch 920 transmits information on the address to the I/O device. Thus, the switch 920 can access an Uncorrectable Error Status Register illustrated in FIG. 17.

As a result, in a similar manner to the case in which the switch accesses a read-only register, when the switch 920 receives a response packet that has the header illustrated in FIG. 6, the switch 920 can detect an abnormal internal state of the I/O device 300 in detail by referencing a data portion of the received packet.

Returning to FIG. 15, after the generating section 922a generates the packet for inspection of the AER register, the generating section 922a writes, in the tag table 921a, the value of the tag added to the generated packet and information on the type.

The transmitting section 922b has the following function added to the same function as the function of the transmitting section 522b described in the second embodiment or the function of the transmitting section 722b described in the third embodiment.

For example, when the I/O device 300 has an AER register standardized by PCI Express, the transmitting section 922b transmits the inspection packet to the AER register.

The first determining section 922d has the following function added to the same function as the function of the first determining section 522d described in the second embodiment or the function of the first determining section 722d described in the third embodiment.

For example, when the first determining section 922d receives a packet transmitted in response to the inspection packet, the first determining section 922d identifies a "tag value" and a "type" that are indicated by the packet transmitted in response to the inspection packet. Then, the first determining section 922d transfers the received packet to the second determining section 922e.

The second determining section 922e has the following function as well as the function of the second determining section 522e described in the second embodiment. When the second determining section 922e receives, from the first determining section 922d, a packet (response packet) transmitted in response to the access to the AER register, the second determining section 922e determines whether or not the response packet has a valid error bit added thereto.

For example, when a value "1" that indicates the valid error bit is added to the response packet, the second determining section 922e determines that the I/O device is abnormal and notifies the abnormality processing section 540 of the determination result.

On the other hand, when a value "0" that does not indicate the valid error bit is added to the response packet, the second determining section 922e determines that the I/O device is normal and deletes the interested information from the tag table 921a.

Figure 18:
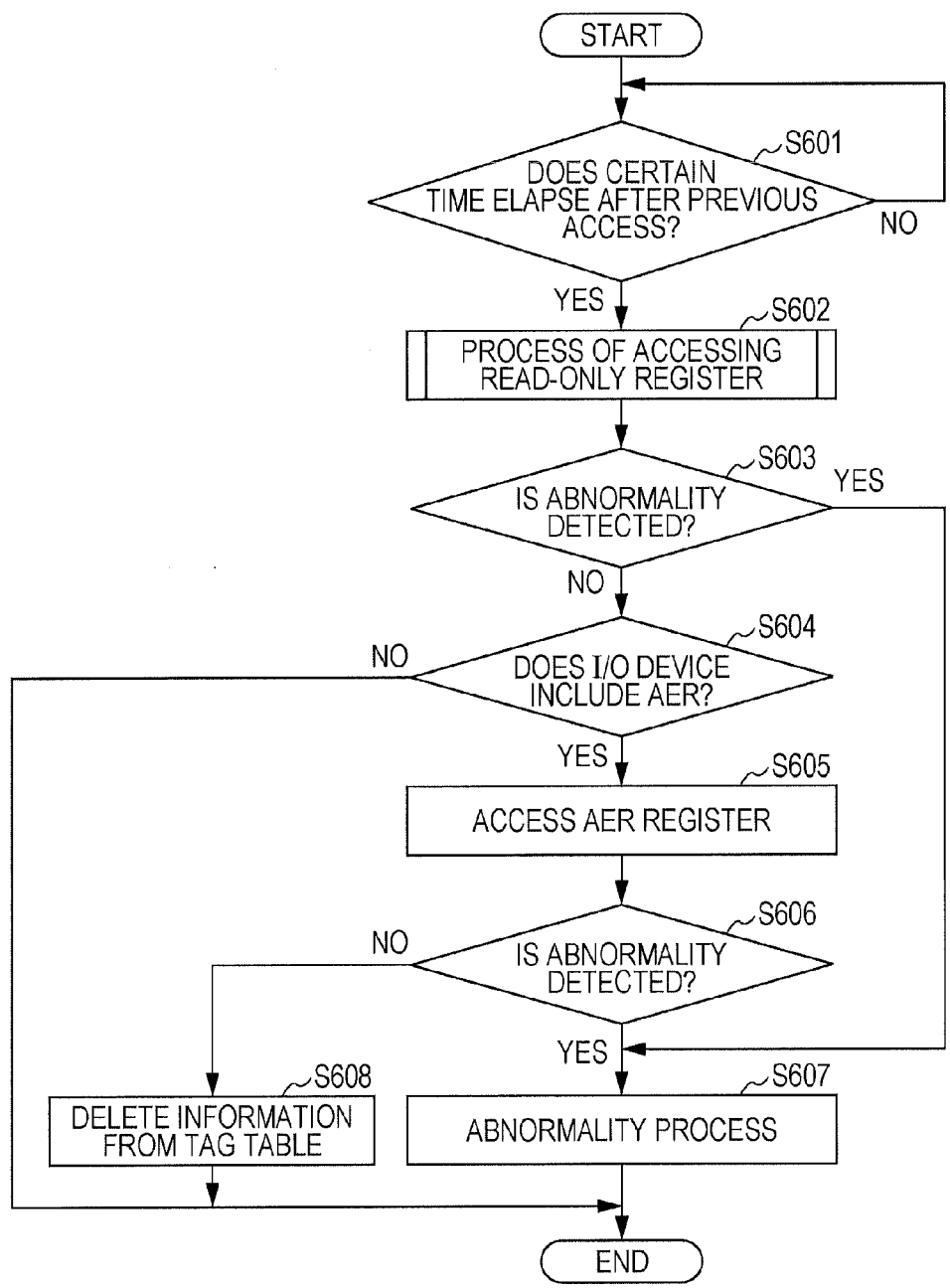
FIG. 18 is a flowchart of a process that is performed by the information processing device according to the fourth embodiment.

Next, steps of a process that is performed by the information processing device 800 according to the fourth embodiment are described with reference to FIG. 18. FIG. 18 is a flowchart of the process that is performed by the information processing device according to the fourth embodiment.

When the generating section 922a determines that a certain time elapses after the previous access (Yes in step S601), the switch 920 performs a process of accessing a read-only register (in step S602). The read-only register accessing process is performed in the same manner as step S102 illustrated in FIG. 8 and the like, and a description thereof is omitted.

The second determining section 922e determines, on the basis of the result of the read-only register accessing process, whether or not an abnormality is detected (in step S603).

When an abnormality is detected (Yes in step S603), the second determining section 922e notifies the abnormality processing section 540 that the abnormality is detected, and the abnormality processing section 540 performs the abnormality process (in step S607).

On the other hand, when an abnormality is not detected (No in step S603), the generating section 922a determines whether or not the I/O device 300 has an AER function (in step S604).

When the generating section 922a determines that the I/O device 300 has the AER function (Yes in step S604), the switch 920 transmits, to the AER register of the I/O device 300, a packet (inspection packet) for inspection of the AER register (in step S605).

On the other hand, when the generating section 922a determines that the I/O device 300 does not have the AER function (No in step S604), the switch 920 terminates the process.

When the second determining section 922e detects an abnormality as a result of the access to the AER register (Yes in step S606), the abnormality processing section 540 performs the abnormality process (in step S607).

Specifically, when a packet transmitted in response to the access to the AER register includes a valid error bit, the second determining section 922e determines that the I/O device is abnormal.

On the other hand, when the packet transmitted in response to the access to the AER register does not include the valid error bit, the second determining section 922e determines that the I/O device is normal (No in step S606), and the second determining section 922e deletes interested information from the tag table 921a (in step S608).

As described above, in the fourth embodiment, when the I/O device 300 has the AER function standardized by PCI Express, the transmitting section 922b transmits the inspection packet generated by the generating section 922a to the AER register.

The second determining section 922e determines whether or not the valid error bit is included in the packet transmitted in response to the access to the AER register. The second determining section 922e inspects, on the basis of the determination result, an abnormality that has occurred in the I/O device 300. The second determining section 922e can acquire detailed information on the inspected abnormality.

[e] Fifth Embodiment

The information processing device disclosed herein may have another configuration. The fifth embodiment describes another example of the information processing device disclosed herein.

In the second to fourth embodiments, the I/O connection device accesses an RO register (that is a common register) and detects an abnormality of the I/O device. The technique disclosed herein is not limited to this.

For example, the I/O connection device can access a register other than the RO registers as long as the I/O connection device does not interfere with the I/O device.

Figures 19, 20:
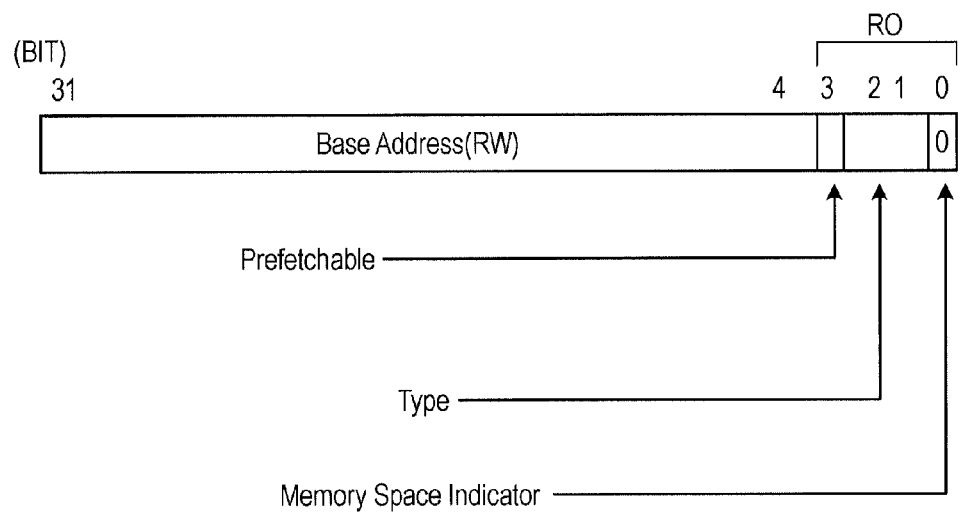
FIG. 19 is a diagram illustrating an example of the types of configuration registers that can be used in this application.
FIG. 20 is a diagram illustrating an example of a base address register that includes registers of different types.

Registers that are not RO registers and can be used in this application are described with reference to FIG. 19. FIG. 19 is a diagram illustrating an example of the types of configuration registers that can be used in this application. Abbreviated names of registers that can be used are indicated in a "type" field illustrated in FIG. 19. A "name" field indicates the official names of the registers that can be used.

For example, the official name of "Hwlinit" is "Hardware Initialized" that indicates a register that is initialized by firmware. In addition, the official name of "RO" is "Read-Only" that indicates a read-only register. The official name of "RW" is "Read-Write" that indicates a readable and writable register. Furthermore, the official name of "RW1C" is "Write-1-to-clear status" that indicates a register that is cleared when 1 is written.

In addition, the official name of "ROS" is "Sticky-Read-only" that indicates a read-only register that is not initialized by resetting.

The official name of "RWS" is "Sticky-Read-Write" that indicates a readable and writable register that is not initialized by resetting.

The official name of "RWICS" is "Sticky-Write-1-to-clear status" that indicates a register that is not initialized by resetting and is cleared when 1 is written.

The official name of "RsvdP" is "Reserved and Preserved" that indicates a reserved register. In addition, the official name of "RsvdZ" is "Reserved and Zero" that indicates a reserved register in which 0 must be written.

Specifically, the information processing device can access a base address register that is included in a PCI Express device.

A base address register that includes an RW register and an RO register is described with reference to FIG. 20. FIG. 20 is a diagram illustrating an example of the base address register that includes registers of different types.

The base address register has 32 bits, while the first 4 bits, i.e., the 0-th to 3rd bits, form the RO register of the base address register.

The 0-th bit forms "Memory Space Indicator", and the value of the 0-th bit is always 0. This indicates that the base address register is provided for a memory space.

The 1st and 2nd bits form "Type" and indicate an address range at which this memory block can be arranged by a combination of bits. The 3rd bit form "Prefetchable". When data is prefetched, the efficiency of transferring the data is improved.

The 4th to 31st bits form the RW register of 28 bits. Thus, the I/O connection device can quickly inspect an abnormality of the inside of an I/O device by accessing the RO register region formed by the 1st to 3rd bits.

The user can select and set an AER register in order to inspect the I/O device.

As described above, in the information processing device 100 according to the second embodiment, when the transmitting section 522b receives, from the generating section 522a, the notification that indicates completion of inspection, the transmitting section 522b transmits the packet transmitted by the CPU 200. The information processing device is not limited to this.

For example, when the first determining section 522d receives an inspection packet that has the same tag as the tag transmitted by the CPU 200, the first determining section 522d deletes, from the tag table 521a, information on the inspection packet.

Subsequently, when the transmitting section 522b receives a notification that indicates that the information on the inspection packet has been deleted, the transmitting section 522b may transmit the packet transmitted by the CPU 200.

Some of the processes described in the present embodiment are automatically performed. All or a part of the processes that are automatically performed in the present embodiment may be manually performed. In addition, some of the processes described in the present embodiment are manually performed. All or a part of the processes that are manually performed in the present embodiment may be automatically performed.

In addition, the process procedures described above and illustrated in the drawings, the control procedures described above and illustrated in the drawings, and the names described above and illustrated in the drawings may be changed except as otherwise indicated herein.

The constituent parts illustrated in the drawings are functionally conceptual, and it is not necessary that the constituent parts be physically configured on the basis of the drawings.

For example, in the information processing device 100, the second determining section 522e and the abnormality processing section 540 may be integrated with each other. In addition, the generating section 522a and the transmitting section 522b may be integrated with each other. All or a part of the processing functions of each of the devices are achieved by a CPU and a program that is analyzed and executed by the CPU. All or a part of the processing functions of each of the devices may be achieved as hardware that has wired logic.

The information processing device 100 has the two switches that are connected to the I/O devices 300 and 400, respectively. However, the number of switches that are included in the information processing device 100 is not limited to two. For example, in the information processing device 100, switches are connected to three or more I/O devices. In addition, the information processing device may be designed and configured so that the connected I/O devices are each redundant.

Figure 21:
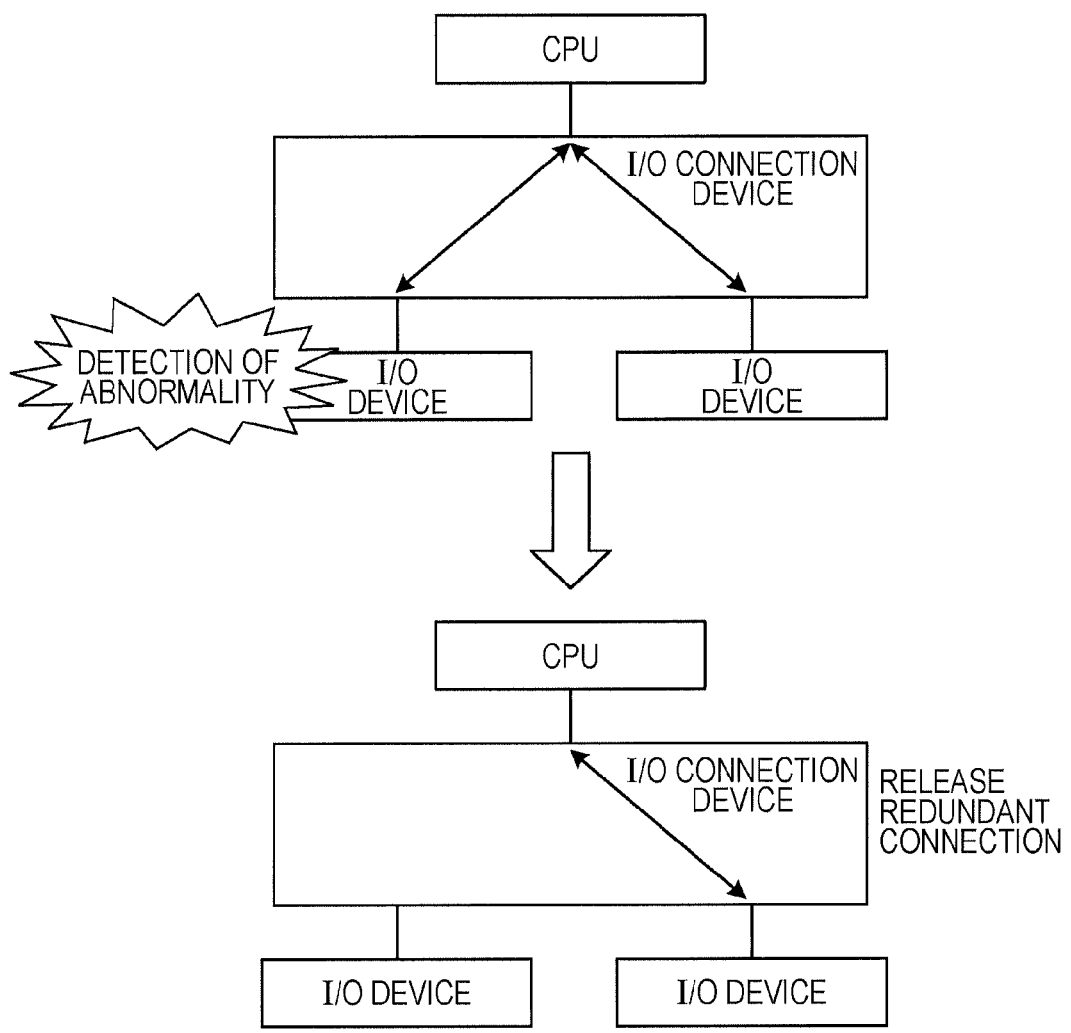
FIG. 21 is a diagram illustrating an example of a process that is performed by an abnormality processing section when I/O devices are redundantly connected to an I/O connection device.

The abnormality process is performed by the abnormality processing section so that an I/O device in which an abnormality has occurred is disconnected. The abnormality process may be performed by the abnormality processing section in a different manner. Another example of the abnormality process that is performed by the abnormality processing section is described with reference to FIG. 21. FIG. 21 is a diagram illustrating the other example of the abnormality process that is performed by the abnormality processing section when I/O devices are redundantly connected to the I/O connection device.

As illustrated in FIG. 21, when the I/O devices are redundantly connected to the I/O connection device, and an abnormality occurs in one of the I/O devices, the I/O device in which the abnormality occurs may be disconnected so that the redundancy is released, and only the other normal I/O device may be connected to the I/O connection device.

In addition, the second determining section may cause the results of inspection of the I/O device to be displayed on a monitor that is not illustrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input/output connection device connecting a CPU and at least one input/output device, the CPU transmitting a first packet with a first tag, the input/output connection device comprising:
    a generating section configured to generate a second packet with a second tag;
    a transmitting section configured to transmit the first packet transmitted from the CPU and the second packet to the at least one input/output device, the transmitting section determining whether or not the first tag added to the first packet has a same value as the second tag added to the second packet, the transmitting section transmitting the first packet to the at least one input/output device when the first tag and the second tag have different values, the transmitting section not transmitting the first packet to the at least one input/output device when the first tag has the same value as the second tag;
    a receiving section configured to receive a third packet with a third tag and a fourth packet with a fourth tag from the at least one input/output device as response packets to the first packet and the second packet, respectively;
    a first determining section configured to determine the third packet and the fourth packet, based on the third tag and the fourth tag; and
    a second determining section configured to analyze the fourth packet so as to detect a failure of the at least one input/output device.

2. The input/output connection device according to claim 1, wherein when the at least one input/output device has an advanced error reporting (AER) register standardized by PCI Express, the transmitting section transmits the second packet to the AER register.

3. The input/output connection device according to claim 1, wherein when the second determining section detects a non-failure of the at least one input/output device, the transmitting section transmits, to the at least one input/output device, the first packet not transmitted.

4. The input/output connection device according to claim 1, wherein when the transmitting section determines that the first tag has the same value as the second tag, the transmitting section rewrites the first tag added to the first packet received from the CPU and transmits, to the at least one input/output device, the first packet that has the rewritten tag.

5. The input/output connection device according to claim 1, wherein the at least one input/output connection device in which the failure is detected is disconnected from control of the input/output connection device.

6. The input/output connection device according to claim 5, wherein when the at least one input/output device in which the failure is detected is duplicated, the active input/output device in which the failure is detected is disconnected from the control of the input/output connection device and a spare input/output device is controlled by the input/output connection device.

7. The input/output connection device according to claim 1, wherein the first determining section determines the third packet and the fourth packet, based on whether the third tag and the fourth tag have the same value as the first tag and the second tag, respectively.

8. The input/output connection device according to claim 1, further comprising:
    a storage section configured to store information on the second tag,
    wherein the second tag is added to the second packet for inspecting the input/output device.

9. An information processing apparatus connecting a CPU and at least one input/output device, the CPU transmitting a first packet with a first tag, the information processing apparatus comprising:
    a generating section configured to generate a second packet with a second tag;
    a transmitting section configured to transmit the first packet transmitted from the CPU and the second packet to the at least one input/output device, the transmitting section determining whether or not the first tag added to the first packet has a same value as the second tag added to the second packet, the transmitting section transmitting the first packet to the at least one input/output device when the first tag and the second tag have different values, the transmitting section not transmitting the first packet to the at least one input/output device when the first tag has the same value as the second tag;
    a receiving section configured to receive a third packet with a third tag and fourth packet with a fourth tag from the at least one input/output device as response packets to the first packet and the second packet, respectively;
    a first determining section configured to determine the third packet and the fourth packet, based on the third tag and the fourth tag; and
    a second determining section configured to analyze the fourth packet so as to detect a failure of the at least one input/output device.

10. A method for inspecting an input/output device executed by an input/output connection device connecting a CPU and at least one input/output device the CPU transmitting a first packet with a first tag, the method comprising:
    generating a second packet with a second tag;
    transmitting the first packet transmitted from the CPU and the second packet to the at least one input/output device, the transmitting determining whether or not the first tag added to the first packet has a same value as the second tag added to the second packet, the transmitting transmitting the first packet to the at least one input/output device when the first tag and the second tag have different values, the transmitting not transmitting the first packet to the at least one input/output device when the first tag has the same value as the second tag;

receiving a third packet with a third tag and a fourth packet with a fourth tag from the at least one input/output device as response packets to the first packet and the second packet, respectively;

determining the third packet and the fourth packet, based on the third tag and the fourth tag; and analyzing the fourth packet so as to detect a failure of the at least one input/output device.

\* \* \* \* \*